United States Patent [19]
Douglass

[11] Patent Number: 5,380,458
[45] Date of Patent: Jan. 10, 1995

[54] STABILIZED HYPOHALITE COMPOSITIONS

[75] Inventor: Miriam L. Douglass, Piscataway, N.J.

[73] Assignee: Colgate-Palmolive Co., New York, N.Y.

[21] Appl. No.: 955,629

[22] Filed: Oct. 2, 1992

[51] Int. Cl.$^6$ ............ C01B 11/06; C01B 11/20; C01B 11/22
[52] U.S. Cl. ............ 252/186.36; 252/187.2; 252/187.24; 252/187.25; 252/187.27
[58] Field of Search ............ 252/187.2, 187.24, 187.25, 252/187.26, 187.27, 186.36

[56] References Cited

U.S. PATENT DOCUMENTS

| | | | |
|---|---|---|---|
| 3,532,634 | 10/1970 | Woods | 252/95 |
| 3,669,891 | 6/1972 | Greenwood et al. | 252/90 |
| 3,749,672 | 7/1973 | Golton et al. | 252/95 |
| 3,749,672 | 7/1973 | Springfield et al. | 252/95 |
| 4,618,402 | 10/1986 | Camus | 162/140 |
| 4,654,043 | 3/1987 | Streit et al. | 252/187.25 |
| 4,898,672 | 2/1990 | Burton | 252/102 |
| 4,995,984 | 2/1991 | Barkatt | 210/670 |
| 5,250,402 | 10/1993 | Okada et al. | 430/393 |

FOREIGN PATENT DOCUMENTS

| | | |
|---|---|---|
| 0119560 | 9/1984 | European Pat. Off. . |
| 2114466 | 6/1972 | France . |
| 62-205-199-A | 9/1987 | Japan . |

Primary Examiner—Robert L. Stoll
Assistant Examiner—Joseph D. Anthony
Attorney, Agent, or Firm—Bernard Lieberman; Robert C. Sullivan

[57] ABSTRACT

The present invention provides for dilute aqueous hypohalite solutions stabilized against decomposition catalyzed by copper ions present in said solution containing a small amount of a multidentate heteroaromatic stabilizer compound including the general structure selected from:

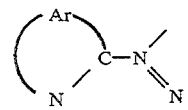

1.

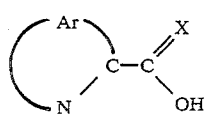

2.

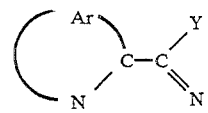

3.

wherein Ar is comprised of carbon or carbon and nitrogen atoms sufficient to form a 5 or 6 membered aromatic ring or at least one other ring condensed with said 5 or 6 membered aromatic ring, X is selected from the group consisting of nitrogen or carbon which form part of an aromatic ring structure and oxygen, and Y is nitrogen or carbon which form part of an aromatic ring structure.

This invention also provides stable hypohalite-containing aqueous bleach, detergent and disinfectant formulations which retain hypohalite stability even after further dilution with copper-contaminated water.

20 Claims, No Drawings

STABILIZED HYPOHALITE COMPOSITIONS

BACKGROUND OF THE INVENTION

1. Field of the Invention

This invention relates to aqueous bleach, cleansing or disinfectant compositions of enhanced stability containing a hypohalite, e.g., sodium hypochlorite, and an effective amount of an N-containing heteroaromatic compound which is stable in the presence of said hypohalite and which is capable of forming multidentate complexes with copper ions present in said composition.

2. Description of Related Art

Alkali or alkaline earth metal hypohalites, most notably sodium hypochlorite, are among the strongest classes of bleaching agents known. Sodium hypochlorite is generally formulated with water at a concentration of less than about 15% by weight for use as a household bleach for laundering or for pulp and textile bleaching. It is also used as a cleansing adjunct in liquid cleaning compositions, e.g., dishwashing liquids, or as a germicide in disinfectant solutions, generally at concentrations of less than about 5% by weight.

One of the major problems associated with the use of these materials is the relative instability of aqueous hypohalite solutions. It is known that aqueous hypochlorite ($OCl^-$) will decompose to chlorate ($ClO_3^-$) when subjected to higher temperatures, e.g., above 40° C., or after prolonged exposure to light. It is also known that the presence of heavy metal ions, e.g., copper, nickel and/or cobalt, in aqueous hypochlorite solutions will catalyze hypochlorite decomposition to oxygen gas and chloride ions. To maintain efficacy, manufacturers of products containing hypochlorite take steps to remove as much as possible of the heavy metal contaminants from the formulations and to provide appropriate packaging materials, storage and use instructions.

However, there are many uses of aqueous hypochlorite where the presence of or introduction of heavy metal decomposition catalysts is beyond the manufacturer's control. Such is the case with respect to concentrated aqueous hypochlorite bleach which is formulated to be diluted by the consumer with water prior to household or industrial use. Storage of unused diluted product can gradually lead to decreased bleaching efficacy and a build up of oxygen pressure in sealed containers as a consequence of the decomposition catalysed by heavy metal contaminants introduced with the dilution water. In addition, detergent and disinfectant compositions containing hypochlorite can be contaminated with heavy metals by contact with metal surfaces during manufacture or as a consequence of the presence of heavy metal in other ingredients present in the formulation such as bases, polyphosphates and pyrophosphates used as builders in dish washing liquids. Container pressurization by the oxygen released in the metal-catalyzed decomposition of hypochlorite can eventually create a hazard as a consequence of container rupture and leakage.

The prior art has recognized that the inclusion of one or more sequestering agents in washing or bleaching solutions containing a hypohalite or other oxidizers can retard the rate of hypohalite decomposition. The agent serves to sequester free heavy metal ions present in the solution thereby theoretically preventing or retarding their action as decomposition catalysts. Examples of such sequestering agents are disodium ethylenediaminetetraacetic acid, trisodium nitrilo triacetate, sodium gluconate and tetrasodium methylenediphosphonate as disclosed in U.S. Pat. No. 3,297,578; 2-hydroxy-3-aminopropionic acid derivatives as disclosed in U.S. Pat. No. 5,112,530; organic hydroxy carboxylic acids such as tartaric acid or inorganic acid salts such as sodium tellurate as disclosed in U.S. Pat. No. 4,474,677; and amino sulfonic acids such as disclosed in U.S. Pat. No. 2,730,428. Most of these compounds are added to the hypochlorite solution immediately prior to use and remain effective only for periods of hours or days, either because the strong oxidative effects of hypochlorite results in their eventual decomposition and loss of effectiveness as sequestering agents or they eventually react with and decompose the hypohalite.

U.S. Pat. No. 3,749,672 discloses an aqueous hypohalite bleaching composition also comprising an equilibrium mixture containing an N-hydrogen compound and the corresponding N-halo reaction product of hypohalite and N-hydrogen compound, stabilized at a pH of 4 to 11 using a mild acidic buffer.

U.S. Pat. No. 4,898,681 discloses dilute aqueous hypohalite solutions which are said to be stable over a period of many months containing the calcium chelate of disodium ethylenediaminetetraacetic acid (EDTA) as a stabilizer. It is speculated in this disclosure that enhanced stability is due to the unique resistance of this material to the oxidizing attack by hypochlorite when compared with the tetrasodium EDTA analog.

In addition, Japanese publication J6-2205-199 discloses that the problem of oxygen generation in closed containers containing hypochlorite bleach is prevented by formulating the composition with a mixture of an oily, oxygen-capturing agent which is an aromatic or aliphatic alcohol, aldehyde or ketone, a surface active agent and an alkaline stabilizer.

While these and other stabilizers may be effective to varying degrees, it has been found that many must be present in the hypochlorite composition in fairly significant amounts to be effective and their presence at these levels may detract from the bleaching/cleansing properties of the composition. In addition, many sequesterants are effective stabilizers only with respect to decomposition catalyzed by certain heavy metal ions present in the hypochlorite solution, e.g., cobalt or nickel, and may be ineffective against copper.

SUMMARY OF THE INVENTION

The present invention provides for dilute aqueous hypohalite solutions stabilized against decomposition catalyzed by copper ions present in said solution, which solutions contain a small amount of a multidentate heteroaromatic stabilizer compound or mixtures of such compounds including the general structure selected from:

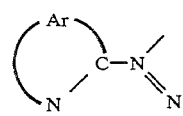  1.

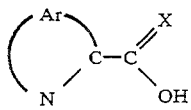  2.

-continued

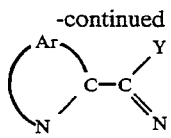
(3)

wherein Ar is comprised of carbon or carbon and nitrogen atoms sufficient to form a 5 or 6 membered aromatic ring or at least one other ring condensed with said 5 or 6 membered aromatic ring, X is selected from the group consisting of nitrogen or carbon which form part of an aromatic ring structure and oxygen, and Y is nitrogen or carbon which form part of an aromatic ring structure.

The stabilizers of the present invention meet three criteria necessary for aqueous hypohalite stabilization:
a) they are effective against copper-catalyzed decomposition of hypohalite;
b) they are not easily decomposed by the oxidative action of hypohalite; and
c) they do not themselves easily react with or decompose the hypohalite.

This invention thus provides stable hypohalite-containing aqueous bleach, detergent and disinfectant formulations which exhibit good shelf stability due to the relative inertness of the stabilizers when combined with hypohalite bleach and which retain significant hypohalite stability even after further dilution with copper - contaminated water.

DETAILED DESCRIPTION OF THE INVENTION

The stabilizers of the invention may be characterized as multidentate ligands having nitrogen, or oxygen and nitrogen, bonding atoms capable of chelating with copper ions to form five membered copper chelate rings and wherein at least one nitrogen atom forms part of a heterocyclic aromatic ring structure. It is believed that the aromatic ring structure present in these stabilizer compounds is the key to their resistance to oxidative decomposition by hypohalite.

The term "aromatic" as used herein and designated in formulas 1, 2 and 3 above refers to nitrogen-containing ring structures containing 4n+2 pi electrons in their orbital structure, where n is any integer, in conformance with Huckel's molecular-orbital calculations, as described by Hendrickson, J. B. et al. "Organic Chemistry" McGraw Hill: New York, 1970 pp 167-169.

Where Ar in formulas 1, 2 and 3 above is monocyclic and n is 1, Ar would be inclusive of pyrrole, imidazole, 1,2,4-triazole, pyridine, pyrimidine, pyridazine, pyrazine, and 1,2,3-, 1,2,4- or 1,3,5-triazines ring structures. Ar is also inclusive of condensed ring structures such as quinoline, isoquinoline, indole, acridine and carbazole.

In a more preferred embodiment of the invention, the stabilizer includes the structure of formula 3 above where both carbon atoms and both nitrogen atoms form part of aromatic rings to yield symmetrical or non-symmetrical compounds of the general structure:

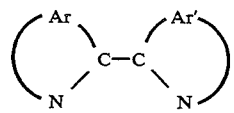
(4)

wherein Ar and Ar' may be the same or different aromatic ring structures.

Examples of representative stabilizers include those of the structures in Table 1, wherein:
ADIPYR is 4-amino-3,5-di-2 pyridyl-4H-1,2,4-triazole;
PHEN is 1,10-phenanthroline;
2,2'-DIPYR is 2,2'-dipyridyl;
1-(2-PYR) is 1-(2-pyridylazo)-2-naphthol;
2-(2-PRY) is 2-(2-pyridyl)benzimidazole;
3-(2-PYR) is 3-(2-pyridyl)-5,6-diphenyl-1,2,4-triazine-p,p'-disulfonic acid, monosodium salt;
4-(2-PYR) is 4-(2-pyridylazo) resorcinol, monosodium salt;
2-(3-SUL) is 2-(3-sulfobenzoyl)pyridine2-pyridylhydrazone;
TERPYR is 2,2':6',2''-terpyridine;
OX is 8-hydroxyquinoline;
PICA is picolinic acid; and
SOX is 8-hydroxyquinoline-5-sulfonic acid.

Especially preferred compounds are those based on di, tri and tetrapyridyl ring structures or condensed pyridyl ring structures such as 2,2'-DIPYR, TERPYR and PHEN described above as well as derivatives thereof including 4,7-diphenyl-1,10-phenanthroline, 2,9-dimethyl-1,10-phenanthroline, 2,9-dimethyl-4,7-diphenyl-1,10-phenanthroline, and 2,2'-biquinoline.

The stabilizer compounds may also contain substituent groups in the aromatic ring structures or elsewhere in the molecule such as lower alkyl or aryl substituents as well as functional groups which tend to enhance the solubility of the compounds in aqueous systems, inclusive of carboxylic and sulfonic acid groups and salts thereof, provided however that these substituent groups do not destroy the relative inertness of the stabilizer compounds in the presence of aqueous hypohalite.

Bleach, cleansing and disinfectant compositions which may be stabilized in accordance with this invention are those based on an aqueous solution of alkali or alkaline earth hypochlorite, hypoiodite or hypobromite having an alkaline pH in excess of 10, generally in the range of from about 11 to about 13, and containing less than 15% by weight of the hypohalite. Of this category, the most preferred and most widely used bleaching agent is sodium hypochlorite.

TABLE 1

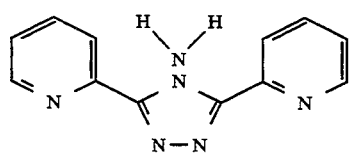

ADIPYR

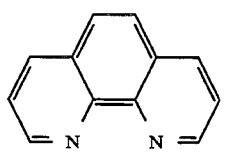

PHEN

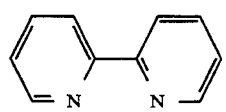

2,2'-DIPYR

TABLE 1-continued

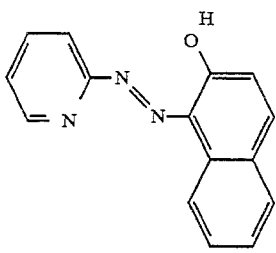

1-(2-PYR)

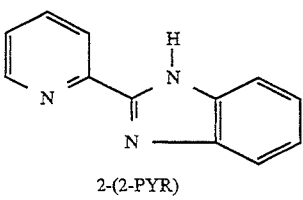

2-(2-PYR)

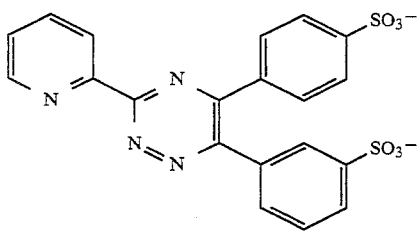

3-(2-PYR)

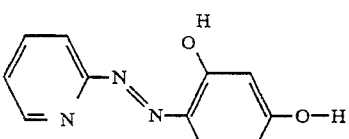

4-(2-PYR)

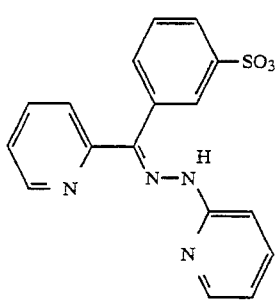

2-(3-SUL)

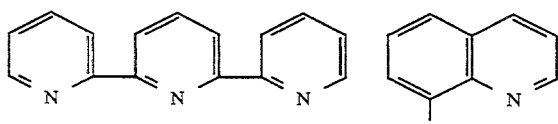

TERPYR          OX

TABLE 1-continued

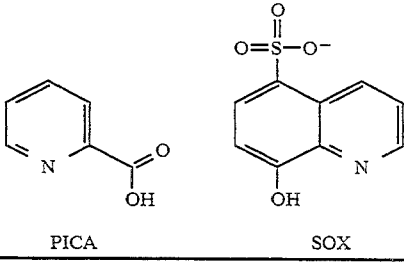

PICA          SOX

Household bleaches marketed to the consumer generally contain sodium hypochlorite at a concentration of about 5% by weight and also contain sodium hydroxide or sodium carbonate sufficient to adjust the pH to a range of 11-13. Disinfectants and detergent compositions generally contain sodium hypochlorite at levels below about 5%, e.g., from about 0.25 to about 3% by weight. Examples of such representative compositions are disclosed in U.S. Pat. Nos. 3,297,578, 4,071,463, and 4,790,953. Thus, stabilized hypohalite compositions within the scope of this invention are those containing from about 0.25 to 15% by weight hypohalite, more preferably from about 0.5 to about 10% by weight hypohalite.

A particular advantage of the present invention is that the amount of heteroaromatic stabilizer required to be added to these hypohalite-containing compositions in order to stabilize the hypohalite against copper-catalyzed decomposition is very small, generally in the range of from about 0.01 to about 0.1% by weight, or to a maximum up to their solubility level in water. The amount of copper contamination which can be expected during manufacture or formulation of these compositions will rarely exceed 5 ppm and the amount of copper contamination introduced by dilution of bleach with water will rarely exceed 0.1 ppm. The stabilizers of the present invention are most effective at levels of from about 50 to about 500 molar excess based on actual or anticipated copper ion content in the composition. The preferred level of addition of the stabilizers of this invention will generally range from about 50 to about 8,000 ppm, more preferably from about 300 to about 1000 ppm.

Compositions prepared in accordance with this invention may also contain other ingredients in amounts commonly employed in bleaching, disinfectant or cleansing compositions. Such ingredients include ionic or non-ionic surfactants, detergents, builders, colorants, perfumes and like additives. The composition may also contain additional stabilizers known in the prior art.

As described above, container pressurization from oxygen released in the metal-catalyzed decomposition of diluted hypochlorite aqueous solutions can be quite severe. For example, a 950 mL sample of 2.0 molar NaOCl contained in a one liter package, if contaminated with 1 ppm $Cu^{2+}$ and stored at 120° F. for 24 hours, would generate enough oxygen to pressurize the 50-mL headspace to 58 atm or 850 psi. This is 15 times the quantity of oxygen that the uncatalysed decomposition would produce under the same storage conditions. The containers normally used to package bleach would burst under this pressure.

The following Examples and tests are illustrative of the invention.

Inhibition of copper-catalyzed hypochlorite decomposition was measured over an approximate 3 to 4 day period at temperatures of from about 50° to 55° C. using an accelerated aging test as follows:

EXAMPLE 1

Solid inhibitors listed in Table 2 were mixed with solutions of sodium hypochlorite in deionized water at a pH of about 12 and cupric chloride to give final concentrations of 2.0 molar NaOCl (140 g/L of available chlorine), 1 ppm $Cu^{2+}$ ($1.6 \times 10^{-5}$ molar) and inhibitor. Bidentate inhibitors were evaluated at 500 or 200 molar excess of the amount of copper in the solution, i.e., 7.85 or 3.18 millimoles respectively, or as otherwise recited in Table 2. About 51 mL. of each test sample was placed in a prerinsed bottle equipped with a stopper having a 3/64" vent hole for oxygen and water vapor release. The samples were stored at the indicated temperatures and weighed daily. Inhibitor effectiveness was assessed by comparing the rate of $O_2$ evolution in the presence of inhibitor to that of (a) the uncatalysed reaction with 0 ppm Cu (equivalent to 100% inhibition) and (b) 1 ppm $Cu^{2+}$ with no inhibitor present (equivalent to 0% inhibition).

Hypochlorite decomposition was measured primarily by weight loss due to oxygen evolution. Percent inhibition at a specific time was determined by the following calculation:

$$\% \text{ Inhibition} = \frac{[g\ O_2(\text{Uninh Cu}) - g\ O_2(\text{Inh Cu})]}{[g\ O_2(\text{Uninh Cu}) - g\ O_2(0\ \text{Cu})]} \times 100$$

TABLE 2

Inhibition OF $Cu^{2+}$-Catalysed NaOCl Decomposition
(1.0 ppm $Cu^{2+}$, 135 g/L Available Cl)

| Inhibitor | Conc (xCu) | % Inhibition | T(°C.) | Time (Hr) |
|---|---|---|---|---|
| N Multidentates | | | | |
| ADIPYR | 200 | 98 | 55 | 70 |
| 2,2'-DIPYR | 200 | 96 | 55 | 73 |
| PHEN | 200 | 100 | 55 | 70 |
| PYR | 400 | 15 | 50 | 90 |
| 1-(2-PYR) | 200 | 46 | 50 | 90 |
| 2-(2-PYR) | 200 | 94 | 55 | 70 |
| 3-(2-PYR) | 200 | 77 | 50 | 73 |
| 4-(2-PYR) | 200 | 49 | 50 | 90 |
| 2-(3-SUL) | 500 | 72 | 50 | 88 |
| TERPYR | 133 | 100 | 55 | 73 |
| O,N Bidentates | | | | |
| EDTA | 500 | 87 | 55 | 73 |
|  | 200 | 33 | 55 | 73 |
| PICA | 500 | 45 | 50 | 90 |
| SOX | 500 | 60 | 50 | 88 |
| OX | 527 | 31 | 50 | 90 |

Results of accelerated evaluation of inhibitor efficacy are shown in Table 2. Each inhibitor is designated by the acronym described above. EDTA (the disodium salt of ethylenediaminetetracetic acid) and PYR (pyridine) are outside the scope of the present invention but were included in the tests for comparative purposes.

As is evident from an analysis of the data in Table 2, all bidentate stabilizers within the scope of this invention are at least comparable to or markedly superior to the hexadentate EDTA which is a well known metal sequesterant. All materials (except OX) exhibited markedly superior inhibition values when compared with pyridine. As the data indicates, the most preferred inhibitors are ADIPYR, 2,2'-DIPYR, PHEN, 2-(2-PYR) and TERPYR.

A comparison of the results for OX and SOX, which is the para sulfonic acid derivative of OX, shows that inclusion of the water-solubilizing $-SO_3^-$ function enhanced the activity of OX.

What is claimed is:

1. A process for inhibiting the copper-catalyzed decomposition of aqueous compositions containing from about 0.25 to about 15% by weight of a bleaching agent selected from the group consisting of an alkali or alkaline earth metal hypochlorite, hypobromite and hypoiodite comprising incorporating into said composition a heteroaromatic compound stable in the present of said bleaching agent and which is capable of forming multidentate complexes with divalent copper ions present in said aqueous composition, said compound being added in an amount sufficient to retard the decomposition of said bleaching agent.

2. The process of claim 1 wherein said bleaching agent is present in said composition at a level of from about 0.5 to about 10% by weight.

3. The process of claim 1 wherein said heteroaromatic compound has a structure selected from the group consisting of (a), (b) and (c):

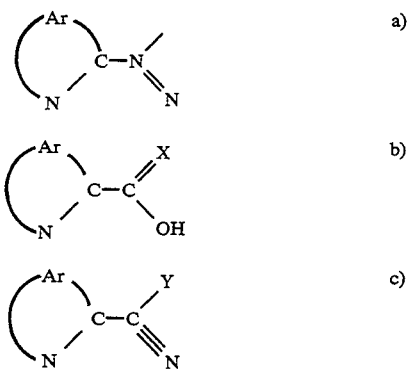

where Ar is comprised of carbon or carbon and nitrogen atoms sufficient to form a 5 or 6 membered aromatic ring or at least one other ring condensed with said 5 or 6 membered aromatic ring, X is selected from the group consisting of nitrogen or carbon which form part of an aromatic ring structure and oxygen, and Y is nitrogen or carbon which form part of an aromatic ring structure.

4. The process of claim 3 wherein said heteroaromatic compound is present at a level of from about 0.01 to about 0.1% by weight.

5. The process of claim 3 wherein said bleaching agent is sodium hypochlorite.

6. The processes of claim 3 wherein said heteroaromatic compound has the structure:

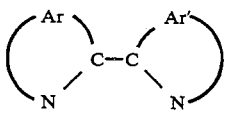

wherein Ar and Ar' are the same or different aromatic ring structures.

7. The process of claim 6 wherein said heteroaromatic compound is selected from the group consisting of 2,2'-dipyridyl; 1,10-phenanthroline; 2(2-pyridyl)benzimidazole; 4-amino-3,5-di-2-pyridyl-4H-1,2,4-triazole and 2,2':6,'2''-terpyridine.

8. The process of claim 7 wherein said bleaching agent is sodium hypochlorite.

9. A dilute aqueous composition comprising a mixture of water and (a) from about 0.25 to about 15% by weight of a bleaching agent selected from the group consisting of an alkali or alkaline earth metal hypochlorite, hypobromite and hypoiodite and (b) an effective amount of a heteroaromatic stabilizer compound stable in the present of said bleaching agent and which is capable of forming multidentate complexes with divalent copper ions present in said aqueous composition, said heteroaromatic compound being present in said composition in an amount effective to retard the decomposition of said bleaching agent.

10. The composition of claim 9 wherein said heteroaromatic compound is present at a level of from about 0.01 to about 0.1% by weight.

11. The composition of claim 9 wherein said bleaching agent is sodium hypochlorite.

12. The composition of claim 9 wherein said bleaching agent is present in said composition at a level of from about 0.5 to about 10% by weight.

13. The composition of claim 9 wherein said heteroaromatic compound is 2,2'-dipyridyl.

14. The composition of claim 9 wherein said heteroaromatic compound has a structure selected from the group consisting of (a), (b) and (c):

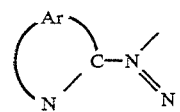  a)

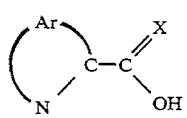  b)

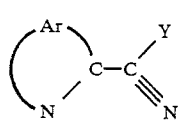  c)

wherein Ar is comprised of carbon or carbon and nitrogen atoms sufficient to form a 5 or 6 membered aromatic ring or at least one other ring condensed with said 5 or 6 membered aromatic ring, X is selected from the group consisting of nitrogen or carbon which form part of an aromatic ring structure and oxygen, and Y is nitrogen or carbon which form part of an aromatic ring structure.

15. The composition of claim 14 wherein said heteroaromatic compound has the structure:

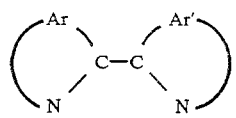

wherein Ar and Ar' are the same or different aromatic ring structures.

16. The composition of claim 15 wherein said heteroaromatic compound is selected from the group consisting of 2,2'-dipyridyl; 1,10-phenanthroline; 2(2-pyridyl)benzimidazole; 4-amino-3,5-di-2-pyridyl-4H-1,2,4-triazole and 2,2':6,'2" terpyridine.

17. The composition of claim 16 wherein said bleaching agent is sodium hypochlorite.

18. A dilute aqueous bleaching composition comprising a mixture of water and (a) from about 0.25 to about 15% by weight of a bleaching agent selected from the group consisting of an alkali or alkaline earth metal hypochlorite, hypobromite and hypoiodite, and (b) from about 0.01 to about 0.1% by weight of a heteroaromatic stabilizer compound stable in the present of said bleaching agent and which is capable of forming multidentate complexes with divalent copper ions present in said aqueous composition, said composition characterized a having a pH in excess of 10 and said heteroaromatic compound having a structure selected from the group consisting of (a), (b) and (c):

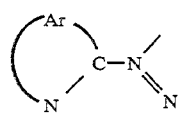  a)

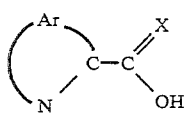  b)

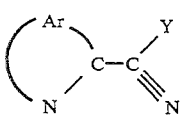  c)

wherein Ar is comprised of carbon or carbon and nitrogen atoms sufficient to form a 5 or 6 membered aromatic ring or at least one other ring condensed with said 5 or 6 membered aromatic ring, X is selected from the group consisting of nitrogen or carbon which form part of an aromatic ring structure and oxygen, and Y is nitrogen or carbon which form part of an aromatic ring structure.

19. The composition of claim 18 wherein said bleaching agent is sodium hypochlorite and wherein said heteroaromatic compound is selected from the group consisting of 2,2'-dipyridyl; 1,10-phenanthroline; 2(2-pyridyl) benzimidazole; 4-amino-3, 5-di-2-pyridyl-4H-1,2,4-triazole and 2,2':6,'2" terpyridine.

20. The composition of claim 19 wherein said heteroaromatic compound is 2,2'-dipyridyl.

* * * * *